United States Patent [19]
Shifflett et al.

[11] Patent Number: 4,592,731
[45] Date of Patent: Jun. 3, 1986

[54] TEACHING APPARATUS

[75] Inventors: David C. Shifflett, Mt. Clemens; Daniel J. Shifflett, Roseville; Dennis I. Shifflett, Mt. Clemens, all of Mich.

[73] Assignee: Al-Ko Products, Inc., Fraser, Mich.

[21] Appl. No.: 712,517

[22] Filed: Mar. 18, 1985

[51] Int. Cl.⁴ .......................................... G09B 17/00
[52] U.S. Cl. .................................................. 434/184
[58] Field of Search ........................................ 434/184

[56] References Cited
U.S. PATENT DOCUMENTS
4,323,349 4/1982 Maltzman et al. ................. 434/184

Primary Examiner—William H. Grieb
Attorney, Agent, or Firm—Krass & Young

[57] ABSTRACT

A teaching apparatus especially for dyslectic students of the type wherein a platen carrying the work lesson is movable between a raised position in which the indicia on the worksheet is readily traceable by a student on tracing paper positioned over a window above the platen to a lowered position where the indicia on the worksheet gradually becomes indiscernible to the student. A bellows is moved to a collapsed position in response to movement of the platen to its raised position and the bellows is operative when extended to move the platen to its lowered position. Valve means are provided to selectively control the rate at which air is allowed to move back into the collapsed bellows to thereby control the rate of extension of the bellows and the rate at which the platen returns to its lowered position.

17 Claims, 7 Drawing Figures

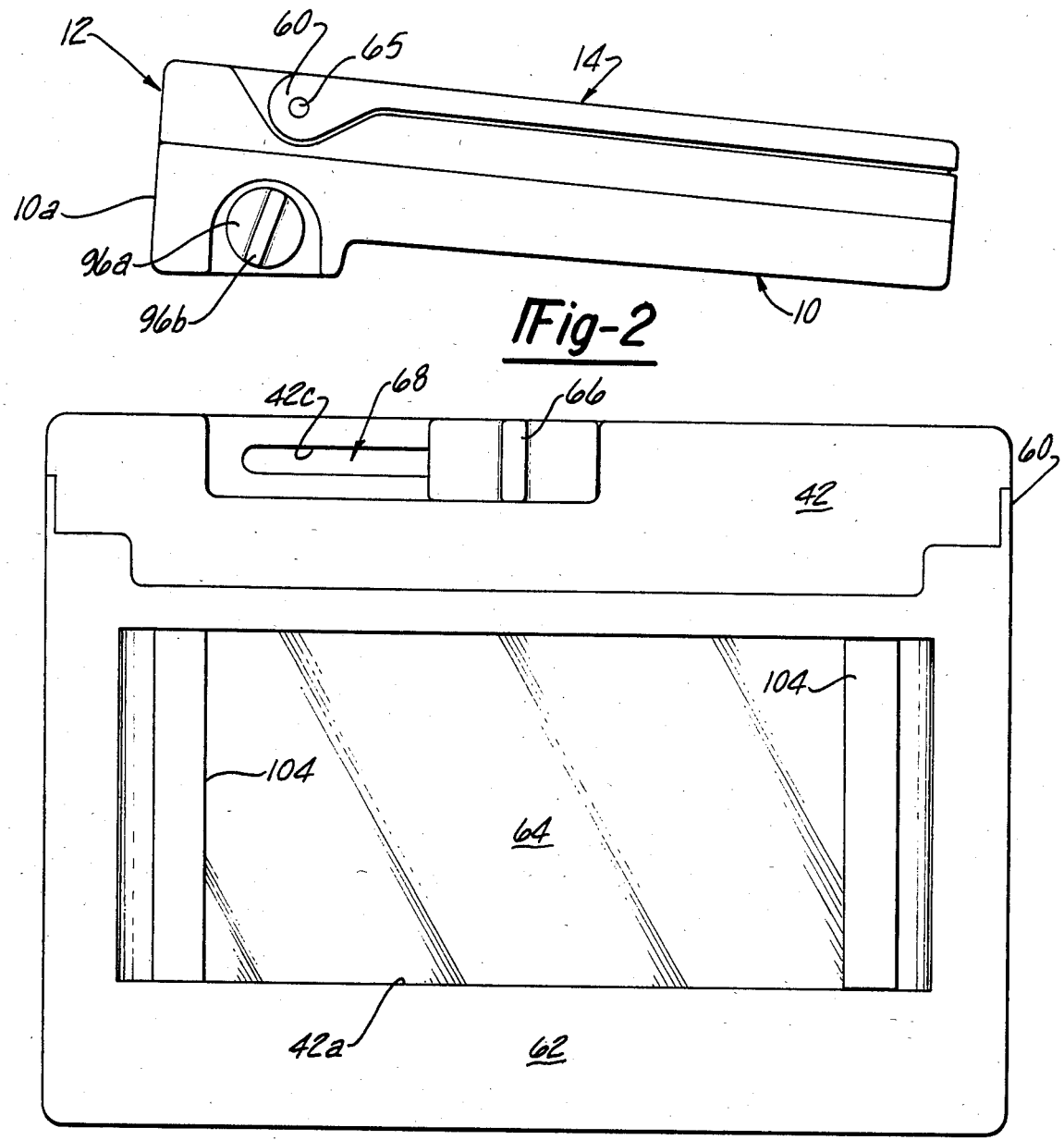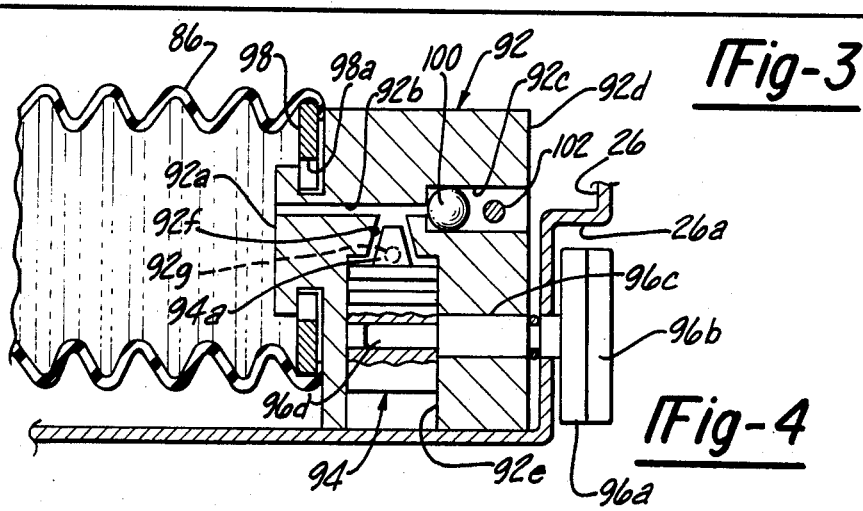

TEACHING APPARATUS

BACKGROUND OF THE INVENTION

This invention is related to teaching apparatuses and more particularly to an apparatus directed to the correction of perceptual learning problems such as dyslexia.

Dyslexia is generally manifested by reversals. For example, a dyslectic might have trouble distinguishing between a "b" and a "d" or a "b" and a "q". Common manifestations of dyslexia as a reading disability occur as a difficulty in inability to distinguish words such as "was" and "saw" or "boys" and "dogs". A dyslectic might write "and" as "dna"; "with" as "whte" or "its" as "ist".

Dyslexia is generally easily detected through an individual's perceptual-motor activities. It may, for example, be observed in any or all of the following: poor ability to reproduce rhythm in sequence; cramped, slowly done or very messy handwriting; frequent miscopying a word in one place while copying correctly in another; making letter and number formations from down to up or from right to left; starting at the wrong place but perhaps ending with the correct symbol; persistently and habitually reversing some letters and/or some numbers, for example, as illustrated above; poor motor coordination either in using play equipment or in manipulating small objects in the classroom or at home; and holding the pencil in a clumsy way when writing, etc. It may also be readily discernible through observations of perceptual abilities and orientation or speech or language behavior.

One known method of training or educating a dyslectic is by working to improve perceptual motor activities and perceptual abilities and orientation. One known useful form of exercise for improving perceptual abilities is tracing. Various exercises are known in the art whereby the dyslectic child is supplied with various lesson materials and is asked to make tracings in one or more colors. One recognized method, referred to as the "Orton-Gillingham Method", requires the pupil to sound out and trace the visually printed word. One aspect of another method for teaching reading, the so-called Montessori method, involves tactile tracing of letters until writing is spontaneous. Other exercises employing tracings to correct and overcome difficulties observed in freehand copying of stimulus design are also known. For example, and as shown in U.S. Pat. No. 4,323,349, a teaching method and apparatus has been proposed wherein the dyslectic student is asked to trace material appearing on a lesson plan which is initially clearly visible but which gradually receeds from view so that the dyslectic must reproduce from memory all or at least a further portion of the remaining subject matter not reproduced by tracing.

BRIEF SUMMARY OF THE INVENTION

This invention is directed to an improvement of the teaching apparatus of the type disclosed in U.S. Pat. No. 4,323,349.

More specifically, this invention is directed to improvement of the described teaching apparatus wherein the operation of the apparatus is rendered smoother, more predictable, and more reproducable, and wherein the apparatus may be inexpensively manufactured on a large scale.

The invention is specifically directed to a teaching apparatus of the type comprising a housing having a window in the top wall thereof, a platen positioned within the housing and movable between a raised position immediately beneath the window and a lowered positioned spaced below the window, and means for moving the platen between its raised and lowered positions. According to the invention, the means for moving the platen in its raised and lowered positions comprises a bellows which is moved to a collapsed position in response to movement of the platen to its raised position and which is operative when extended to move the platen to its lowered position, and valve means which are selectively controllable to vary the rate at which air is allowed to move back into the collapsed bellows to thereby control the rate of extension of the bellows and the rate at which the platen returns to its lowered position. This arrangement provides a smooth and consistent movement of the platen to its lowered position and allows precise and reproducable control of the rate at which the platen moves to its lowered position.

According to a further feature of the invention, a handle is positioned on the exterior of the housing for access by a user; a lever is mounted within the housing for pivotal movement in response to actuation of the handle; drive means are provided within the housing which respond to pivotal movement of the lever to raise and lower the platen; and one end of the bellows is fixed to the housing and the other end of the bellows is connected to the lever at a location thereon spaced from the pivot axis of the lever so that the bellows is extended and collapsed in response to pivotal movement of the lever.

According to a further feature of the invention, the valve means includes a main body member fixedly positioned within the housing adjacent the outside edge of the housing; a valving element is mounted for valving movement within the housing; one end of the bellows is secured to the valve main body member with the interior of the bellows communicating with a valve port in the main body member; and a control knob on the exterior of the housing extends through an outside wall of the housing and is operative when manipulated by a user to move the valving element within the valve main body portion and thereby selectively vary the rate at which air flows through the valve and into the bellows to extend the bellows and move the platen to its lowered position.

BRIEF DESCRIPTION OF THE DRAWINGS

FIG. 2 is a side elevational view of the invention teaching apparatus;

FIG. 3 is a plan view of the invention teaching apparatus;

FIG. 4 is a cross sectional view taken on line 4—4 of FIG. 1;

DETAILED DESCRIPTION OF THE PREFERRED EMBODIMENT

Figure 1:
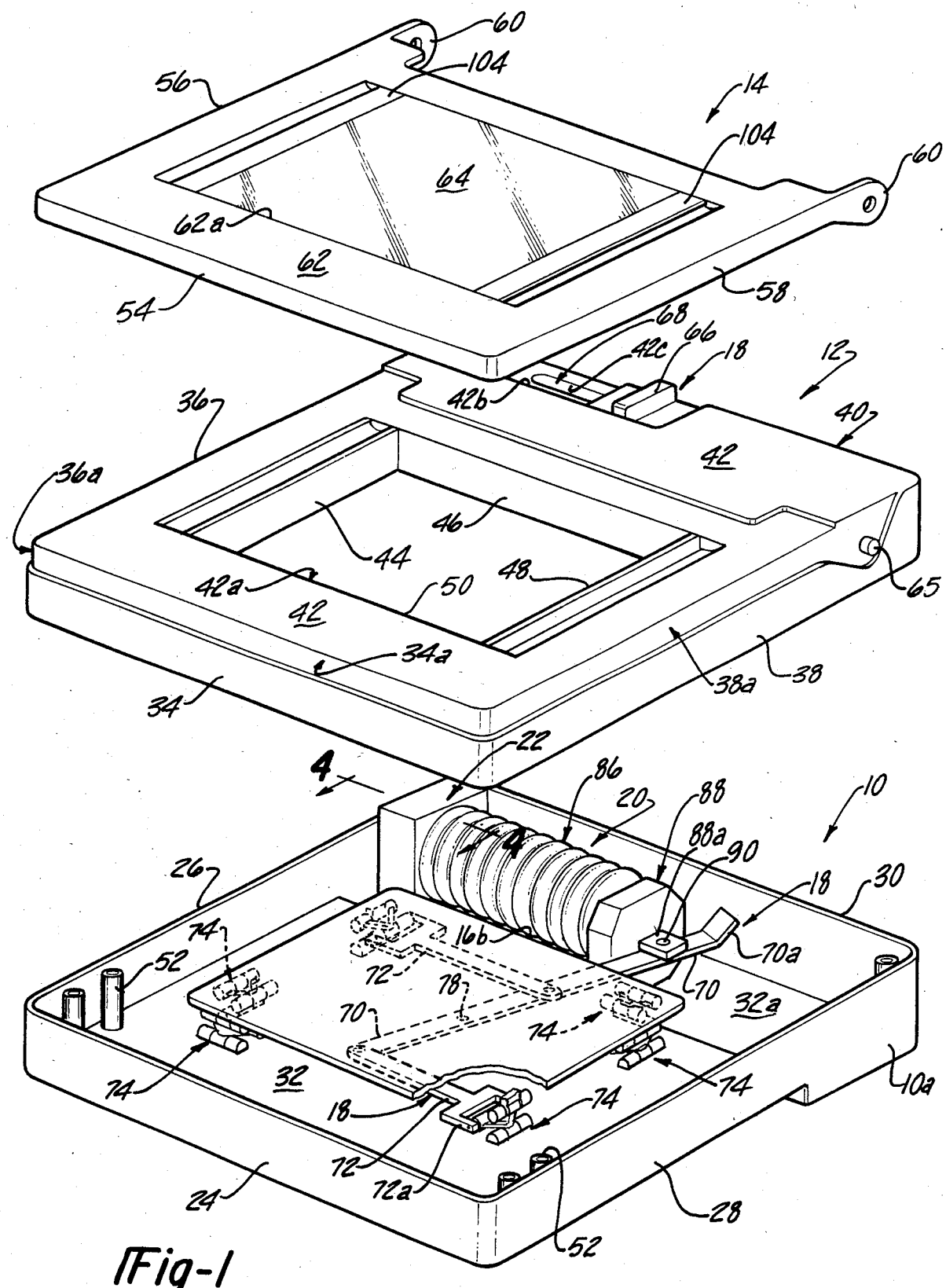
FIG. 1 is an exploded perspective view of the invention teaching apparatus.

The invention teaching apparatus, broadly considered, includes a bottom structure 10, a top structure 12, a lid 14, a platen 16, a drive mechanism 18 for raising the platen, a bellows assembly 20 for controlling the descent of the platen, and a valve assembly 22 for varying the rate of descent of the platen.

Bottom structure 10 is formed of a suitable injection molded plastic and includes a front wall 24, side walls 26 and 28, a rear wall 30 and a bottom wall 32. Bottom structure 10 includes a heel portion 10a at the rear of the bottom structure which provides a downward inclination to bottom wall 32 and provides a recessed bottom portion or well 32a at the rear of the bottom structure.

Top structure 12 is also formed of an injection molded plastic and includes a front wall 34, side walls 36 and 38, rear wall 40 and a top wall 42. Top wall 42 is cut out to define a generally rectangular opening 42a bounded by downwardly extending partitions 44,46,48 and 50. Top structure is fixedly secured to bottom structure 10 by screws (not shown) passing upwardly through integral pylons 52 on the bottom structure for threaded coaction with coacting integral pylons (not shown) extending downwardly from the top panel 42 of top structure 12.

Lid 14 is preferably formed of a translucent plastic material and includes a front wall 54, side walls 56 and 58, ears 60 constituted as rearward extensions of the side walls 56 and 58, and a top wall 62. A window panel 64 of suitable transparent material is fixed secured as by gluing in a rectangular opening 62a in top wall 62. Ears 60 are pivotally mounted on trunions 66 formed integral with top structure 12 to mount lid 14 for pivotal movement between a raised position providing access to opening 42a in base structure 12 and a lowered position in which window panel 64 overlies opening 42a and walls 54, 56 and 58 of lid 14 fit snugly and telescopically over upper wall portions 34a, 36a and 38a of top structure 12.

Platen 16 comprises a rectangular plastic plate having a size slightly smaller than the size of opening 42a in top structure 12 so that the platen may move vertically within walls 44, 46, 48 and 50 of top structure 12 without interference.

The drive means 18 for moving the platen to its raised position comprises a handle 66, a slide member 68, a lever 70, a pair of drive links 72, and a plurality of hinge assemblies 74.

Handle 66 is positioned in a recess 42b in the top wall 42 of top structure 12 and is fixedly joined through a guide slot 42c to slide member 68 which is positioned within the chamber of the housing. A tang 68a extends downwardly from slide 68 for driving coaction with the upwardly extending end portions 70a of lever 70 and a coil spring 76 is secured to slide 68 and to the housing so as to resist leftward movement of handle 66 and slide 68 as viewed in FIG. 7 and return the handle and slide to their rest positions upon release of the handle.

Lever 70 is pivotally mounted at 78 to the bottom wall 32 of bottom structure 10 and extends beneath the platen 16. Drive links 72 are pivotally secured at their inner ends to lever 70 at opposite sides of pivot axis 78 and coact at their outer ends with a respective hinge assembly 74.

Figure 6:
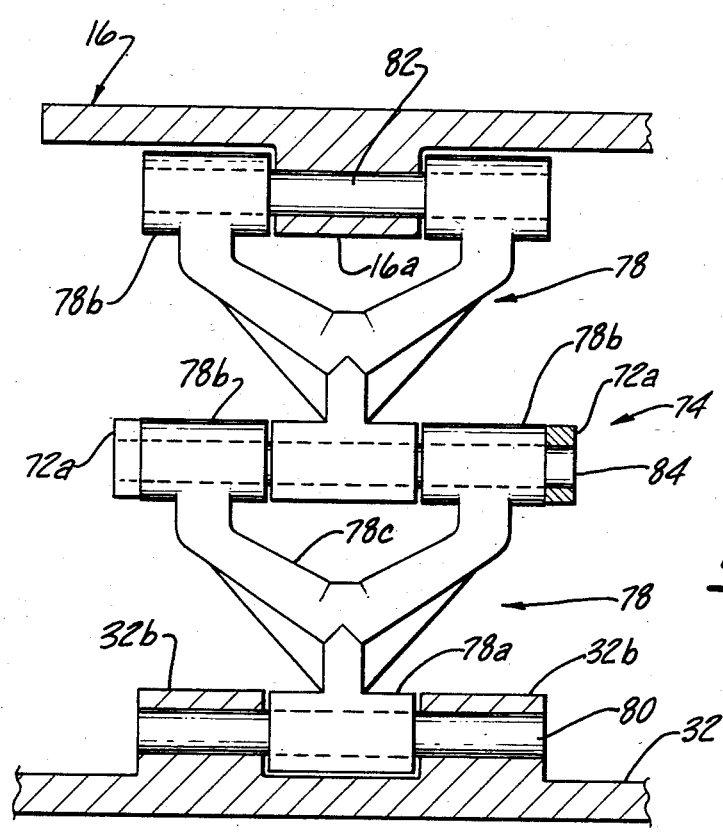
FIG. 6 is an enlarged, detailed view of the hinge mechanism used to move the platen between its lowered to its raised positions.

Each hinge assembly 74, as best seen in FIG. 6, includes a pair of hinge members or links 78. Each hinge member 78 is formed of a molded plastic material and includes a lower central journal portion 78a, a pair of spaced upper journal portions 78b, and a journal arm structure 78c interconnecting lower journal portion 78a with spaced upper journal portions 78b. In assembled relation, the lower journal portion 78a of lower hinge member 78 is positioned between spaced journal portions 32b on bottom panel 32; lower journal portion 78a of the upper hinge member is positioned between spaced upper journal portions 78b of the lower hinge member; the spaced upper journal portions 78b of the upper hinge member straddle a journal portion 16a on the underside of platen 16; a hinge pin 80 extends through bottom wall hinge portions 32b and lower journal portion 78a of the lower hinge member; a hinge pin 82 extends through upper journal portions 78b of the upper hinge member and platen journal portion 16a; and a hinge pin 84 extends through the upper journal portions 78b of the lower hinge member, the lower journal portion 78a of the upper hinge member, and through spaced finger portions 72a provided at the outer end of drive link 72. As best seen in FIG. 1, a drive link 72 is associated with the hinge assembly 74 at diagonally opposite corners of platen 16. Non-driven hinge assemblies 74 are provided at the other corners of the platen for stabilization and balance purposes and a further pair of hinge assemblies 74 are provided along the forward and rearward edges of the platen to inhibit forward or rearward tilting or swaying of the platen during raising and lowering operations.

Figure 5:
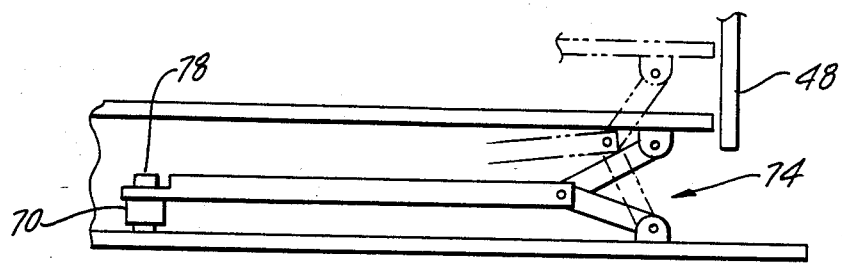
FIG. 5 is a schematic view showing the movement of the platen between its lowered and its raised positions.
Figure 7:
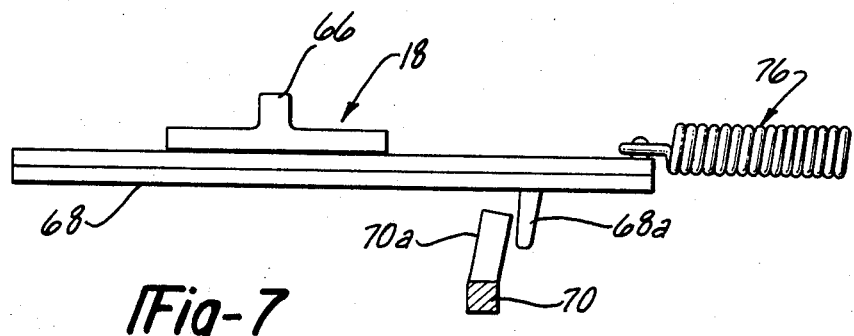
FIG. 7 is a schematic view showing a portion of the drive mechanism for moving the platen from its lowered to its raised position.

It will be seen that sliding movement of handle 66 to the left as viewed in FIGS. 1 and 7 will move slide 68 to the left to cause tang 68a to drivingly engage end 70a of lever 70 to pivot lever 70 about pivot axis 78 and drive drive links 72 outwardly. Outward movement of drive links 72 moves the hinge assemblies 74 from their collapsed position as seen in solid line in FIG. 5 to the raised position as seen in dotted lines in FIG. 5, whereby to raise the platen from its solid line lowered position of FIG. 5 to its dotted line raised position of FIG. 5. The platen's upward movement is precisely and exactly vertical so that the platen moves in a uniformly spaced relation to partitions 44, 46, 48 and 50 defining opening 42a in top structure 12.

Bellows assembly 20 includes a bellows member 86 formed of a suitable plastic material, and an end cap 88. Bellows 86 is positioned in the space between rear edge 16b of platen 16 and the rear wall 30 of bottom structure 10 and extends generally parallel to the rear edge of the platen and rear wall 30. An extension 88a of end plate 88 is pivotally connected at 90 to lever 70 between the platen rear edge 16b and lever end portion 70a.

Valve assembly 22 includes a main body member 92, a valving element 94, and a control knob 96. Main body member 92 is formed of a rigid plastic material and includes an integral bayonet portion 92a for insertion and twist receipt in a slot 98a formed in an annular member 98 positioned in the end pleat of the bellows 86. Main body member 92 also includes a horizontally extending bore 92b opening in bayonet portion 92a and a counter bore 92c opening in the outer face 92d of main body member 92. A ball 100 is positioned in counter bore 92c and a rod 102 extends across counter bore 92c to preclude movement of ball 100 out of the counter bore. Main body member 92 also includes a vertically extending bore 92e opening at the bottom face of main body member 92 and extending upwardly therein. A tapered conical bore 92f extends between the upper end of vertical bore 92e and horizontal bore 92b and a further horizontal bore 92g extends from a side vertical face of main body member 92 and opens in vertical bore 92e immediately adjacent the juncture of bore 92f and bore 92e.

Valving element 94 is positioned for vertical sliding movement within vertical bore 92e and includes a conical portion 94a at its upper end for valving coaction with conical bore 92f.

Control knob 96 includes a disk portion 96a positioned in a recess 26a provided in side wall 26 of bottom structure 10; a rib portion 96b for grasping by the user; a journal portion 96c extending through side wall 26 and through a bore in main body member 92; and an eccentric portion 96d received in a suitable opening in valving element 94 so that rotation of control knob 96 by a user moves valving element 94 within bore 92e by virtue of the eccentric disposition of portion 96d relative to portion 96c.

In use, the learning disabled student raises lid 14 to place a sheet of lesson material to be traced on platen 16. The student thereafter closes the lid and depresses suitable side spring clip members 104 to allow insertion of a sheet of tracing paper beneath the raised edges of clips 104 to secure the sheet of tracing paper in firm position over window panel 64. The student now grasps handle 66 and moves the handle to the left as viewed in FIGS. 1 and 6. This movement causes tang 68a of slide 68 to drivingly engage lever end 70a to move drive links 72 outwardly and move hinges assemblies 74 from their collapsed to their raised positions to thereby move the platen from its lowered to its raised position. In its raised position, the platen is positioned immediately beneath window panel 64 so that the student can clearly discern the indicia on the worksheet carried by the platen through the sheet of tracing material. Movement of handle 66 to the left also serves to collapse bellows 86 with the air in the bellows escaping through bore 92b and past ball 100 for exit through counter bore 92c. A similar check valve exhaust structure may be provided in end plate 88 to further facilitate exhausting of air from the collapsing bellows. After the student has moved the platen to its raised position, the student releases the handle and the handle 66 and slide 68 are returned under the force of spring 76 to their rest position. The platen now begins a slow descent to its lowered position and the student traces the indicia on the worksheet on the platen as the platen is gradually lowered. The speed with which the platen moves to its lowered position is determined by the setting of valve assembly 22. Specifically, and as is best seen in FIG. 4, air enters the expanding bellows through passage 92g, conical passage 92f and passage 92b. The rate at which the incoming air moves through this system of passages is determined by the relative position of valving element conical portion 94a in conical bore 92f and this relative position is determined by the angular position of control knob 96. Specifically, as control knob 96 is turned, eccentric portion 96d of the control knob shaft undergoes a limited vertical displacement relative to the center line of the control knob shaft to thereby impart a limited vertical displacement to valving element 94 and selectively control the position of conical valving element portion 94a in conical port 92f. The various dimensions and parameters of the valve and bellows may be chosen, for example, such as to allow the platen to move to its lowered position over a time period ranging from a few seconds to as much as perhaps a full minute.

The invention teaching apparatus will be seen to provide a simple and effective means for teaching dyslectic students. Specifically, the invention apparatus is extremely simple for the student to use; the movement of the platen from its raised to its lowered position is extremely smooth and predictable; the rate at which the platen moves to its lowered position may be precisely and reproducably controlled by selective rotation of the control knob to a predetermined or preselected angular position; and the entire apparatus may be inexpensively produced in mass quantities so that it may be made available to students at a reasonable price.

Whereas a preferred embodiment of the invention has been illustrated and described in detail, it will be obvious that various changes may be made in the disclosed embodiment without departing from the scope or spirit of the invention.

We claim:

1. In a teaching apparatus of the type comprising a housing having a window in the top wall thereof, a platen positioned within the housing and movable between a raised position immediately beneath the window and a lowered position spaced below the window, and means for moving the platen between its raised and lowered positions, the improvement wherein said moving means includes:
   A. a bellows moved to a collapsed position in response to movement of said platen to its raised position and operative when extended to move said platen to its lowered position; and
   B. valve means selectively controlling the rate at which air is allowed to move back into said collapsed bellows to thereby control the rate of extension of said bellows and the rate at which said platen returns to said lowered position.

2. A teaching apparatus according to claim 1 wherein:
   C. said moving means further includes
      1. a handle positioned on the exterior of said housing for access by a user,
      2. a lever mounted within said housing for pivotal movement in response to actuation of said handle, and
      3. means operative in response to pivotal movement of said lever to raise or lower said platen; and wherein
   D. one end of said bellows is fixed to said housing and the other end of said bellows is connected to said lever at a location thereon spaced from the pivot axis of said lever so that said bellows is extended and collapsed in response to pivotal movement of said lever.

3. A teaching apparatus according to claim 2 wherein:
   E. said operative means comprises hinge means positioned beneath said platen and a drive link connected at one end to said lever at a location thereon spaced from said pivot axis and connected at its other end to said hinge means.

4. A teaching apparatus according to claim 3 wherein:
   F. said hinge means comprises a pair of hinge links;
   G. one end of one of said hinge links is pivotally connected to the underside of said platen;
   H. one end of the other of said hinge links is pivotally connected to said housing and the other end of said other hinge link is pivotally connected to the other end of said one hinge link; and I. said other end of said drive link is pivotally connected to the pivotal connection of said hinge links.

5. A teaching apparatus according to claim 4 wherein:
J. said lever extends beneath said platen and is pivotally mounted on said housing generally centrally of said platen;
K. hinge means each including a pair of links, are provided adjacent each corner of said platen; and
L. a pair of drive links extend from said lever at opposite sides of said pivot axis for pivotal connection at their outer ends to a respective hinge means.

6. A teaching apparatus according to claim 5 wherein:
M. the top wall of said housing is inclined to provide an angled writing surface that is highest adjacent the rear edge of the housing;
N. the rear edge of said platen is generally parallel to but spaced from the rear edge of said housing;
O. one end portion of said lever projects from beneath said platen into the space between the rear edge of the platen and the rear edge of the housing;
P. said bellows is positioned in said space and extends generally parallel to said rear housing edge; and
Q. said other end of said bellows is connected to said projecting lever portion.

7. A teaching apparatus according to claim 6 wherein:
R. said handle is drivingly connected to said projecting lever portion.

8. A teaching apparatus according to claim 7 wherein:
S. said handle is mounted for bidirectional movement on said housing and is operative to drive said lever in only one direction of handle movement;
T. said handle, when moved from its rest position in said one direction, is operative to collapse said bellows and raise said platen; and
U. said apparatus further includes spring means resisting movement of said handle in said one direction and operative upon release of said handle to move said handle in the opposite direction to its rest position, whereby to allow the platen to return to its lowered position without interference from said handle at a speed determined by the setting of said valve means.

9. A teaching apparatus according to claim 1 wherein:
C. said valve means includes
1. a main body member fixedly positioned within said housing adjacent an outside edge of said housing,
2. a valving element mounted for valving movement within said main body member, and
3. a control knob accessible outside of said housing and operative when manipulated by a user to move said valving element within said main body member;
D. one end of said bellows is secured to said main body member;
E. exhaust conduit means are provided in said main body member for exhausting air from said bellows as the bellows collapses;
F. intake conduit means are provided in said main body member; and
G. said valving element is positioned in said intake conduit means and controls the rate at which air reenters the collapsed bellows in accordance with the setting of said control knob.

10. A teaching apparatus according to claim 9 wherein:
H. said apparatus further includes a check valve in said exhaust conduit means allowing exhausting of air from said bellows through said exhaust conduit means but precluding introduction of air to said bellows through said exhaust conduit means.

11. A teaching apparatus according to claim 10 wherein said apparatus further includes:
I. a handle positioned outside of said housing for access by a user;
J. drive means, including a drive lever, positioned within said housing and operative to raise said platen in response to movement of said handle; and
K. an end plate closing the other end of said bellows and drivingly connected to said drive lever.

12. A teaching apparatus comprising:
A. a generally rectangular hollow housing having bottom, side, rear and front walls and a top wall including a fixed portion adjacent the rear of said housing and a hinged lid portion extending from the front edge of said fixed portion to the front edge of said housing and mounted for pivotal movement generally about its rear edge;
B. a window formed in said lid portion;
C. a platen positioned within said housing on said bottom wall beneath said window and movable between a raised position directly underlying said window and a lowered positioned spaced below said window; and
D. means for selectively moving said platen between its raised and lowered positions and including
1. a handle member positioned on said fixed top wall portion and mounted for bidirectional sliding movement in said fixed top wall portion in a direction generally parallel to the rear edge of said housing and
2. drive means positioned beneath said fixed top wall portion and operative in response to bidirectional sliding movement of said handle to raise and lower said platen.

13. A teaching apparatus according to claim 12 wherein:
E. said drive means includes a bellows positioned within said housing beneath said fixed top wall portion and extending generally parallel to said rear housing edge and arranged to be collapsed in response to movement of said handle in a direction to raise said platen.

14. A teaching apparatus according to claim 13 wherein:
F. said drive means further includes
1. a valve member positioned within said housing beneath said fixed top wall portion and adjacent one side wall of said housing and including a control knob extending through said one side wall for access by a user, and
2. a drive link positioned within said housing and having a drive end disposed beneath said handle in a position to be engaged and driven by said handle as said handle is moved in a direction to raise said platen;
C. one end of said bellows is mounted to said valve member and the other end of said bellows is drivingly connected to said drive link end so that the bellows is collapsed in response to movement of said handle in a direction to raise said platen and the expanding bellows is operative to move said platen to its lowered position; and D. said control knob is selectively movable by a user to vary the rate at which air is allowed to flow back into the collapsed bellows, whereby to vary the rate at which said platen returns to its lowered position.

15. A teaching apparatus according to claim 14 wherein:

E. said drive link comprises a drive lever extending from said drive end thereof beneath said platen; and F. said drive means further includes hinge means positioned beneath said platen and movable between raised and collapsed positions in response to pivotal movement of said drive lever.

16. A teaching apparatus comprising:

A. a housing;

B. a window in the top wall of said housing;

C. a platen disposed within said housing and movable between a raised position immediately beneath said window and a lowered position spaced below said window;

D. a drive link positioned within said housing for bidirectional movement;

E. means operative in response to movement of said drive link in one direction to raise said platen and in response to movement of said drive link in the other direction to lower said platen;

F. a handle on the exterior of said housing for access by a student;

G. a bellows positioned within said housing with its one end fixed to said housing and its other end drivingly connected to said drive link and arranged to collapse in response to movement of said drive link in said one direction and, upon expansion, to drive said drive link in said other direction; and H. means operative in response to movement of said handle to move said drive link in said one direction to raise said platen and collapse said bellows, whereafter said bellows expands to move said platen to its lowered position.

17. A teaching apparatus according to claim 16 and further including:

I. a valve at said one end of said bellows controlling the flow of air into said bellows: and J. a control knob on the exterior of said housing for access by the student and operative when adjusted to vary the setting of said valve and thereby vary the rate at which air reenters said bellows to thereby control the rate at which said bellows returns said platen to its lowered position.

* * * * *